(12) United States Patent
Anderson et al.

(10) Patent No.: US 10,766,471 B2
(45) Date of Patent: Sep. 8, 2020

(54) DECOUPLED ELECTRONIC BRAKING SYSTEM WITH A MOVEMENT TRANSMISSION DEVICE WITH RADIAL EFFECT COMPENSATION

(71) Applicant: Robert Bosch GmbH, Stuttgart (DE)

(72) Inventors: Chris Anderson, Paris (FR); Florent Yvonet, Trilport (FR); Raynald Sprocq, Eesbly (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/477,413

(22) PCT Filed: May 9, 2018

(86) PCT No.: PCT/EP2018/062161
§ 371 (c)(1),
(2) Date: Jul. 11, 2019

(87) PCT Pub. No.: WO2019/011504
PCT Pub. Date: Jan. 17, 2019

(65) Prior Publication Data
US 2019/0375387 A1 Dec. 12, 2019

(30) Foreign Application Priority Data
Jul. 13, 2017 (FR) .................................. 17 56686

(51) Int. Cl.
*B60T 8/40* (2006.01)
*B60T 7/04* (2006.01)
(52) U.S. Cl.
CPC ............... *B60T 8/409* (2013.01); *B60T 7/042* (2013.01); *B60T 2270/82* (2013.01)

(58) Field of Classification Search
CPC ........ B60T 7/042; B60T 11/18; B60T 8/4086; B60T 2270/82
See application file for complete search history.

(56) References Cited

U.S. PATENT DOCUMENTS

2016/0016569 A1* 1/2016 Odaira .................... B60T 7/042
303/15

FOREIGN PATENT DOCUMENTS

DE   102011016240 A1 * 10/2012  ............ B60T 13/683
FR       2828533 A1    2/2003
WO    2010006978 A1    1/2010
(Continued)

OTHER PUBLICATIONS

International Search Report for PCT/EP2018/062161, dated Aug. 29, 2018.

*Primary Examiner* — Thomas C Diaz
(74) *Attorney, Agent, or Firm* — Norton Rose Fulbright US LLP; Gerard Messina

(57) ABSTRACT

A system in which the device connecting the brake pedal to the brake actuator includes a control rod and a thrust rod guided in a cylinder, connected to the rod by a ball joint and returned by a spring. The end of the rod comprises a spherical cap having a spherical front bearing surface and a flat rear surface, perpendicular to the axis of the rod. A centering sleeve freely surrounding the control rod presses with its front edge against the rear face of the cap, pushed by a centering spring bearing on the thrust rod and on the centering sleeve to tilt the spherical cap and the rod toward the axis of the thrust rod.

9 Claims, 6 Drawing Sheets

(56) References Cited

FOREIGN PATENT DOCUMENTS

WO     2011026804 A1    3/2011
WO     2015165450 A1    11/2015

\* cited by examiner

DECOUPLED ELECTRONIC BRAKING SYSTEM WITH A MOVEMENT TRANSMISSION DEVICE WITH RADIAL EFFECT COMPENSATION

FIELD

The present invention relates to a decoupled electronic braking system with a movement transmission device connecting the brake pedal to the electrohydraulic brake actuator and having a control rod connected to the brake pedal and a thrust rod in the form of a piston guided within a cylinder of the actuator, the thrust rod being connected to the extremity of the control rod by a ball joint connection and returned in response to the thrust of the control rod by a return spring, wherein the thrust rod has a bearing surface in the shape of a cup freely accommodating rotationally/pivotingly the ball joint of the control rod.

BACKGROUND INFORMATION

Decoupled electronic braking systems are being increasingly used in hybrid vehicles, enabling dynamic braking and/or flexibility in adjusting pedal response on the basis of demand.

In a decoupled braking system, the actuator that generates pressure in the hydraulic brake circuit is not directly controlled by pedal thrust, transmitted to the thrust rod by the control rod, but by an electronic signal generated by this pedal thrust movement. The signal, therefore, controls the actuator as a function of the braking request. Because of this physical decoupling, because the actuator cannot directly apply a response to the thrust rod and control rod, representing the response of the brake circuit, a brake simulator replaces it and imitates the response of the conventional braking system in response to the brake pedal.

In other words, in such systems the extremity of the control rod connected to the brake pedal is directly connected to a hydraulic thrust rod sliding inside the brake actuator, unlike conventional systems in which the actuator rod is connected to a pneumatic or electric brake booster component, which transmits the input force amplified by the components of the actuator unit. In this way, the sliding hydraulic component and the guide characteristics are directly subjected to all the forces coming from the pedal when the driver applies them or releases the pedal in different braking situations. Such components are, typically, much more sensitive to wear and malfunction than those of a conventional brake booster.

Additionally, in the absence of an intermediary brake booster between the brake pedal and the hydraulic components of the actuator, the transverse loads transmitted by the pedal housing to the hydraulic components by means of the control rod lead to premature wear, resulting in premature leakage of the seal components of the hydraulic circuit.

The control rod of a brake actuator, such as a pneumatic or electromechanical brake booster, requires a certain degree of freedom to operate, according to the kinematic needs imposed by the movement of the brake pedal actuated by the driver.

The actuator is fixed at its base to the firewall separating the vehicle's passenger compartment from the engine compartment, and the control rod crosses an opening realized in the firewall so it can be connected to the brake pedal or its housing.

In the case of an actuator consisting of a pneumatic brake booster, because of its internal structure, the control rod is naturally aligned along the axis of the thrust rod whenever it is still free, before installation of the actuator with the control rod in the vehicle and attachment of its second extremity to the brake pedal, the first being connected to the brake booster control device by a ball joint connector.

But, in the case of decoupled actuators, the control rod is not naturally maintained along the axis of the thrust rod. It can pivot freely within the solid angle defined by the characteristics of the shape of the thrust rod. However, to install the brake actuator in the vehicle, the operator must first pass the extremity of the control rod through an opening in the firewall, then hold the base of the actuator against the firewall and attach it to this with bolts.

In the case of electromechanical or electrohydraulic actuators, this installation is relatively difficult due to the very freedom of movement of the control rod with respect to the actuator, because the control rod pivots from its own weight and does not remain in the axis of the thrust rod. Therefore, the operator must feel around in order to pass the rod through the opening in the firewall.

To this is added the difficulty of access inside the vehicle engine compartment and the discomfort of the operator when installing this actuator. This results in a relatively lengthy and, therefore, costly operation as well as risking damage to the contacts as a result of direct impact with the surroundings.

SUMMARY

An object of the present invention is a decoupled electronic braking system having a movement transmission device connecting the brake pedal to the brake actuator, facilitating its placement and installation in the vehicle, reducing the duration of the operation, and compensating for the radial effects applied to the control rod.

An object of the present invention is a decoupled electronic braking system having a movement transmission device connecting the brake pedal to the brake actuator of the type described above, characterized in that the control rod has a means for elastically returning the control rod toward the axis of the thrust rod cylinder, this return means being carried by the thrust rod.

The elastic return means thereby not only enables the control rod to be maintained along the axis of the device during the initial installation phase, it also ensures, throughout the entire duration of the life of the device, at least partial compensation for the tipping torque that the control rod (in its operating position, which is the inclined position) imparts to the thrust rod, thereby causing wear and sealing defects.

According to another characteristic, the elastic means of return toward the axis comprises the extremity of the control rod, having a ball joint in the shape of a spherical cap with a spherical front bearing surface and a flat rear surface, perpendicular to the axis of the control rod, a sleeve freely surrounding the control rod, sliding in a borehole of the thrust rod and pressing, perpendicularly to the axis of the thrust rod, against the rear face of the spherical cap, a spring pressing against the thrust rod and against the centering sleeve to push this and tilt the spherical cap and control rod in the axis of the thrust rod against the weight of the control rod.

In particular, the sleeve has a flange against which rests, on one side, the flat rear surface of the cap and, on the other, the centering spring.

Thus, the sleeve can press directly upon the flat rear face of the cap to cause it to tilt perpendicularly to the axis of the thrust rod, that is, press by means of an internal flange on the plane face of the cap, itself partly engaged in the sleeve, on one side of the flange, the centering spring being pressed against the other side of the flange.

Maintaining the control rod in the axis of the thrust rod considerably simplifies installation of the actuator because the operator naturally finds the control rod in the axis of the thrust rod. This orientation of the control rod is well defined and is easily found, in such a way that the operator can very quickly slide the extremity of the control rod into the opening in the firewall and attach the base of the actuator to the firewall.

This time savings for the operation is extremely important, given the great number of such operations on an assembly line. Moreover, the operation is much simpler for the operator, who easily identifies this orientation along the axis, so that the operation very quickly becomes completely automatic for him.

According to another advantageous characteristic, the elastic means to return the control rod toward the axis is an elastic ring engaged on the control rod, this ring being held in place on the thrust rod by an interior groove of the thrust rod, the ring being tightly engaged on the control rod so that its compression by the control rod deviated from the axis of the thrust rod against the internal surface of the thrust rod generates a return torque toward the axis.

This solution has the benefit of the simplicity of economy to the detriment of an enhanced precision of the compensation operation.

According to another advantageous characteristic, the thrust rod has a borehole in which the centering sleeve slides.

According to another characteristic, the centering spring is held against the thrust rod with a retaining ring, held in place by a snap ring embedded in the thrust rod.

BRIEF DESCRIPTION OF THE DRAWINGS

The present invention are described below in greater detail using an example of an embodiment of a decoupled electronic braking system with a transmission device connecting the brake pedal to the brake actuator represented in the figures.

DETAILED DESCRIPTION OF EXAMPLE EMBODIMENTS

Figure 1:
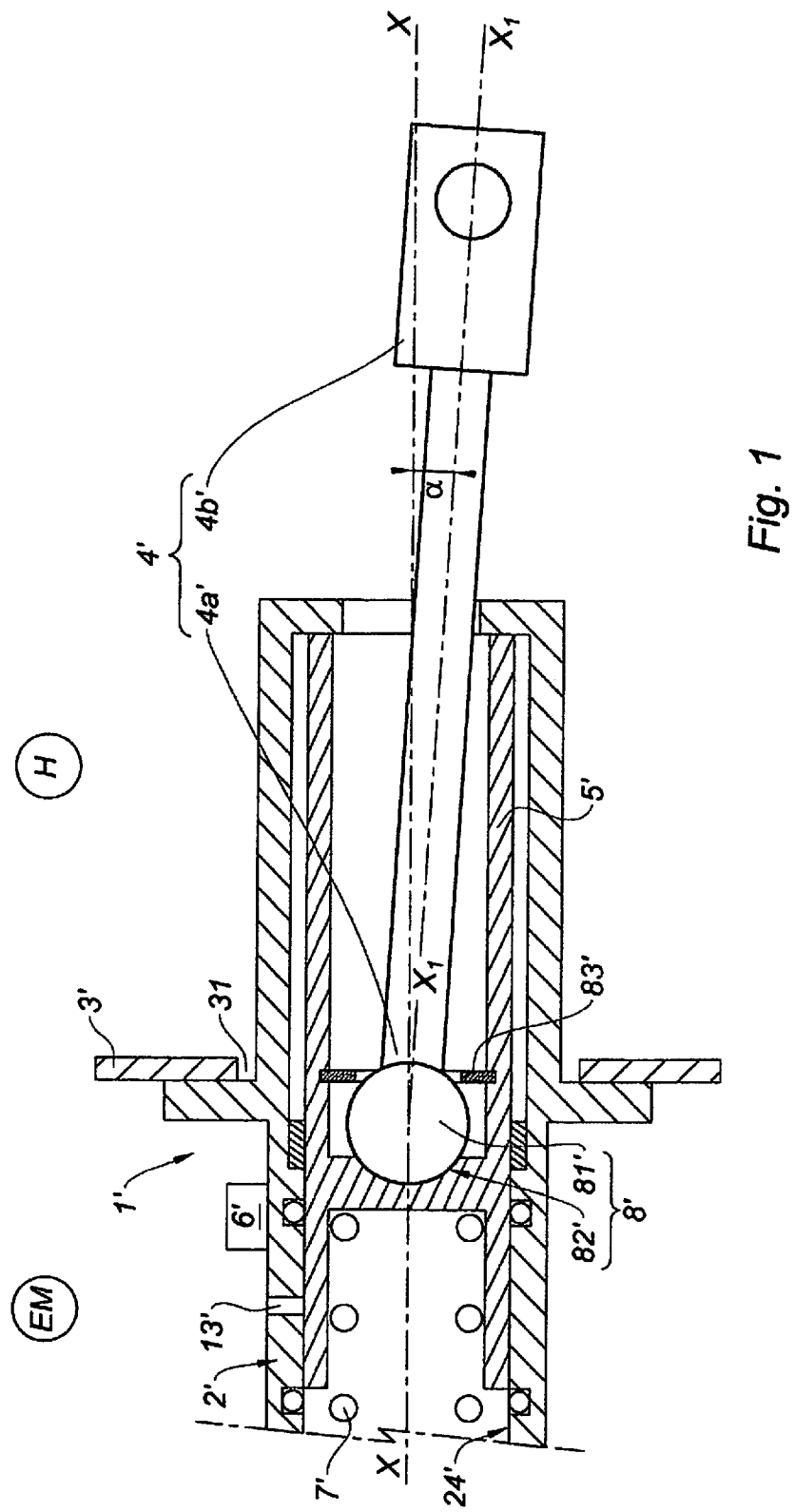
FIG. 1 is a partial cutaway of a conventional transmission device before its installation in the vehicle.

FIG. 1 shows a decoupled electronic braking system according to the state of the art, with transmission device 1' connecting the brake pedal, not shown, to brake actuator 2'. The brake pedal is located on the passenger compartment side, H, of firewall 3', separating passenger compartment H and its engine compartment EM, housing brake actuator 2' and the other components of the brake system, which are not shown.

Brake actuator 2', which is an electromechanical or electrohydraulic brake booster, not shown in detail, receives the brake control signal from the brake pedal. Movement of the brake pedal, actuated by the driver, is sent by control rod 4', connecting the brake pedal to thrust rod 5'. Thrust rod 5', shaped like a piston, is guided in cylinder 24' along axis XX of actuator 2'. The movement of thrust rod 5' is detected by sensor 6', which supplies the signal to the electronic module generating the control signal applied to the brake circuit.

Thrust rod 5', pushed by control rod 4', is returned to neutral position, primarily by return spring 7'. Extremity 4a' of control rod 4' is connected to thrust rod 5' by ball joint connector 8' because the pivoting movement of the brake pedal imposes, upon control rod 4', a pivoting movement with respect to axis XX of thrust rod 5'.

Ball joint connector 8' is formed by ball joint 81', carried by extremity 4b' of control rod 4', and terminating in spherical cap 82' of thrust rod 5'. Ball joint 81' is held in cup 82' by elastic washer 83' embedded in an internal groove of thrust rod 5' and leaving control rod 4' free. In the position of transmission device 1', which is conventional, prior to its installation in the vehicle, control rod 4' is inclined by its own weight with respect to the XX axis by angle α.

The chamber delimited by cylinder 24' ahead of thrust rod 5' can have one or more hydraulic branches 13' to other components of the brake system, as well as communicating with the brake fluid reservoir in rest position. These various means are described in general rather than in detail because they are not directly necessary for understanding the present invention.

Figure 2:
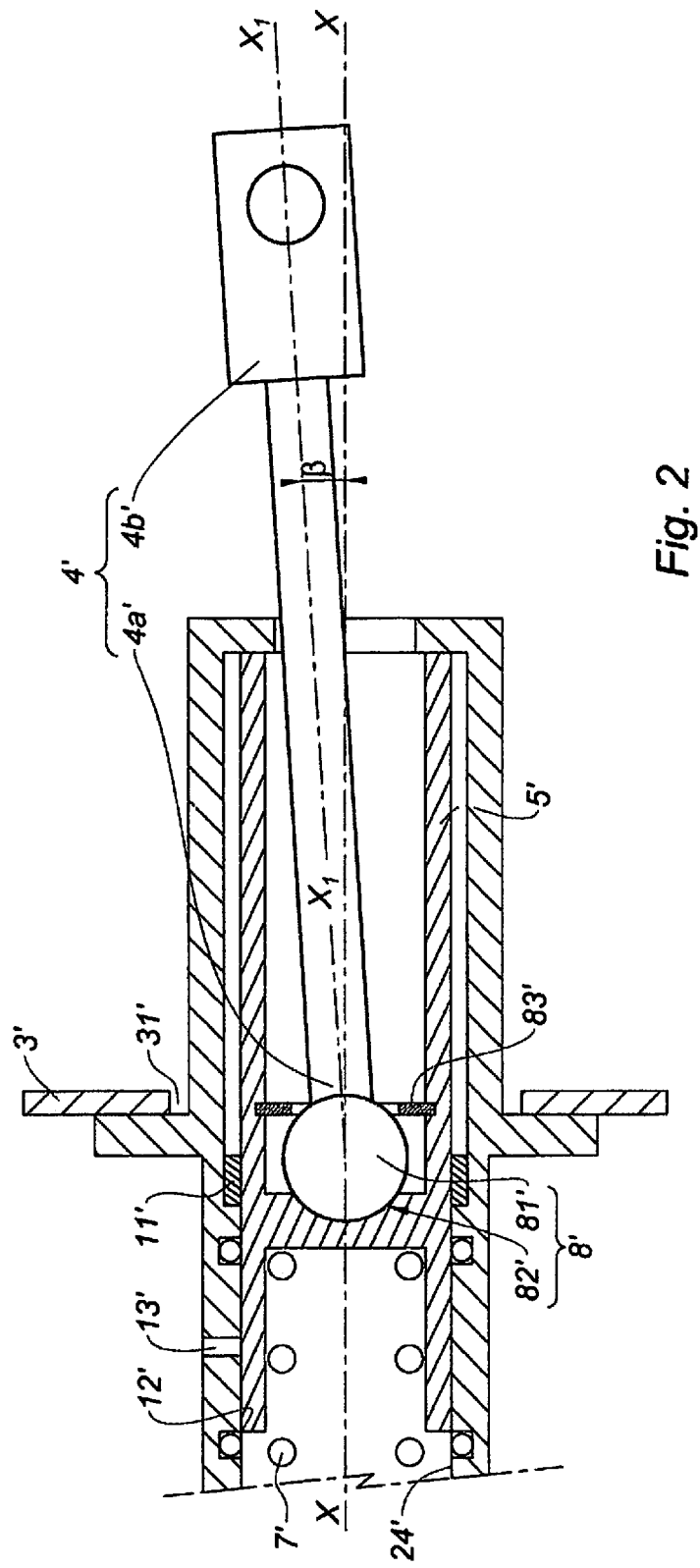
FIG. 2 is a partial cutaway of the conventional transmission device, installed between the brake pedal and the brake actuator.

FIG. 2 shows transmission device 1', which is conventional, after its installation, affixed to firewall 3'. The yoke at extremity 4b' of control rod 4' is connected to the brake pedal, which is not shown. In this position, control rod 4', with axis X1X1, is inclined by angle β (here, above axis XX), which corresponds to a rest position and also to a position when actuated by the brake pedal, angle β varying with the actuating movement.

In these different positions, control rod 4' does not act along axis XX of thrust rod 5', creating a tipping torque applied to thrust rod 5', so that the thrust rod is applied schematically to guide zones 11', 12' in cylinder 24', that is, at entryway 11' of the borehole of cylinder 24' and/or variable guide zone 12' at the extremity of thrust rod 5', on the side of spring 7'. Active guide zones 11', 12' at the top and/or bottom of thrust rod 5', depending on the orientation of FIG. 2, are dependent on the decomposition of the thrust force exerted by control rod 4', based on inclination β of control rod 4'.

Figure 3:
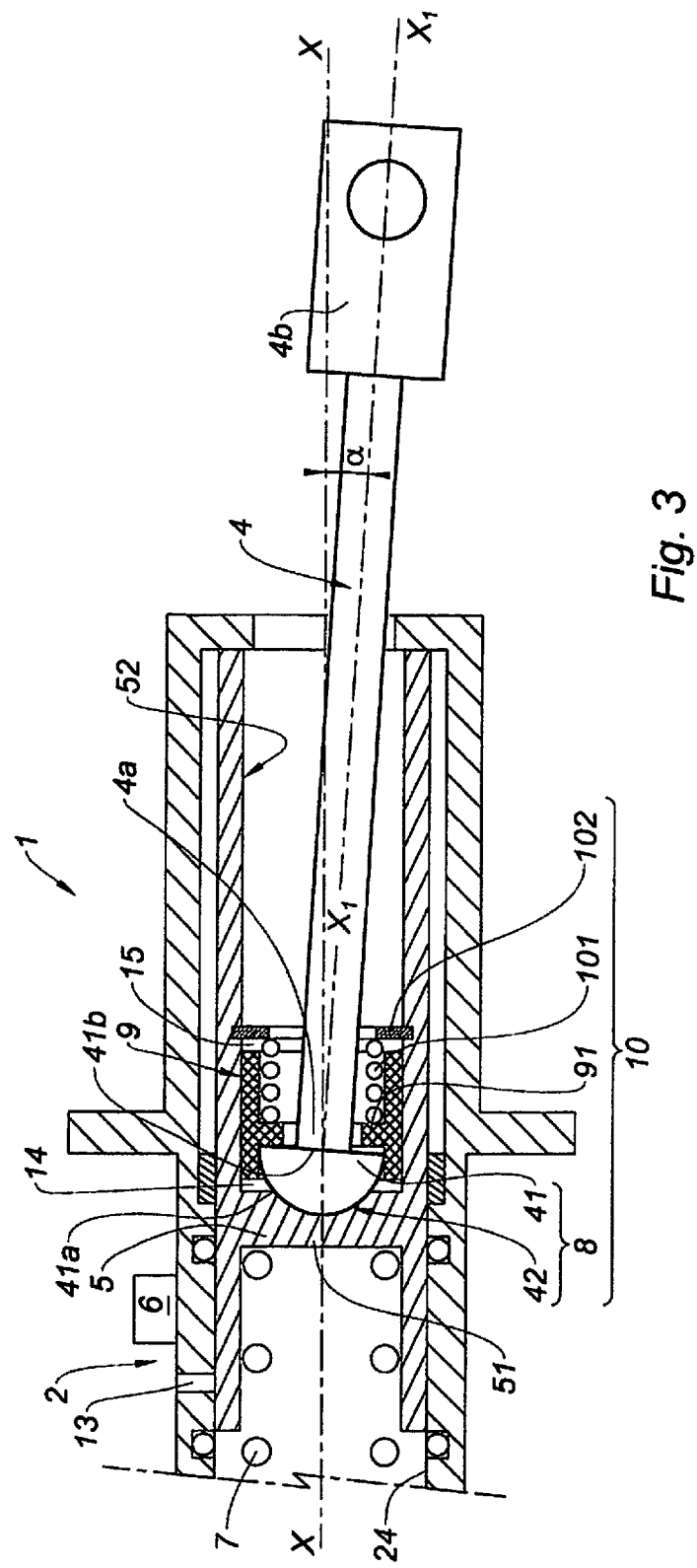
FIG. 3 is a cross-sectional view of the transmission device according to the present invention, explicating the return of the control rod along the axis of the device.
Figure 4:
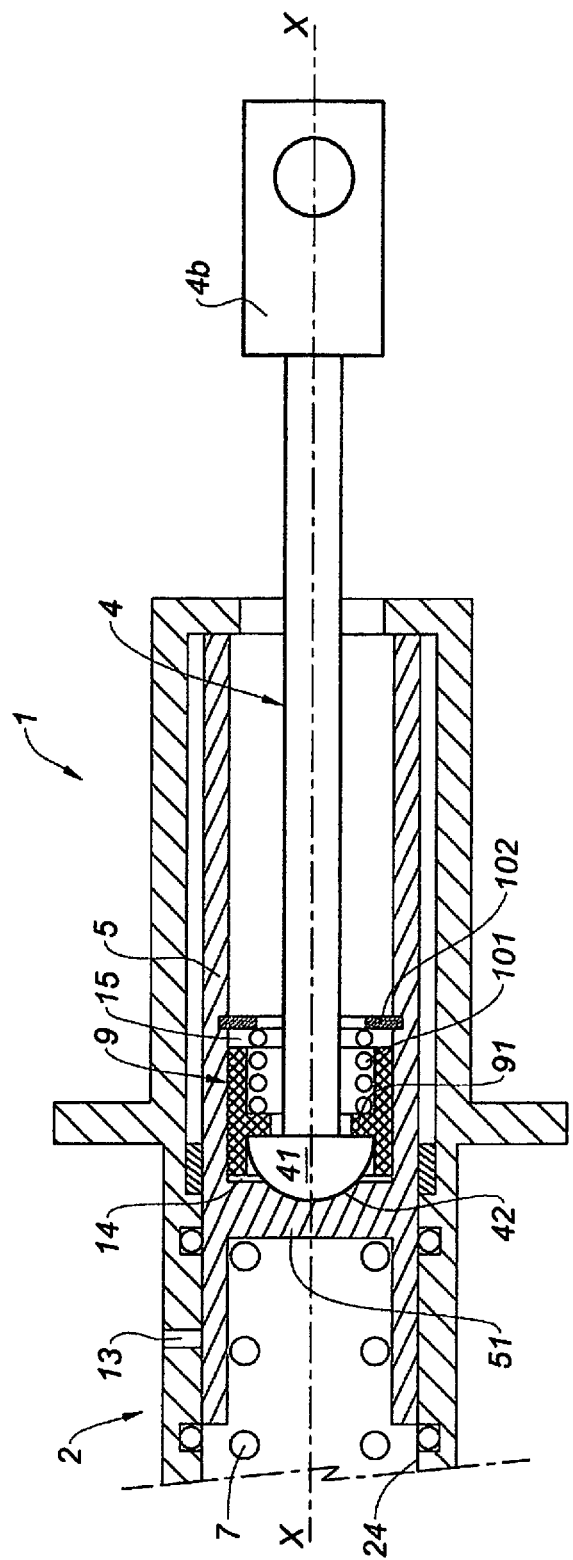
FIG. 4 represents the device of FIG. 3 in its vertical position before installation of the device in the vehicle.
Figure 5:
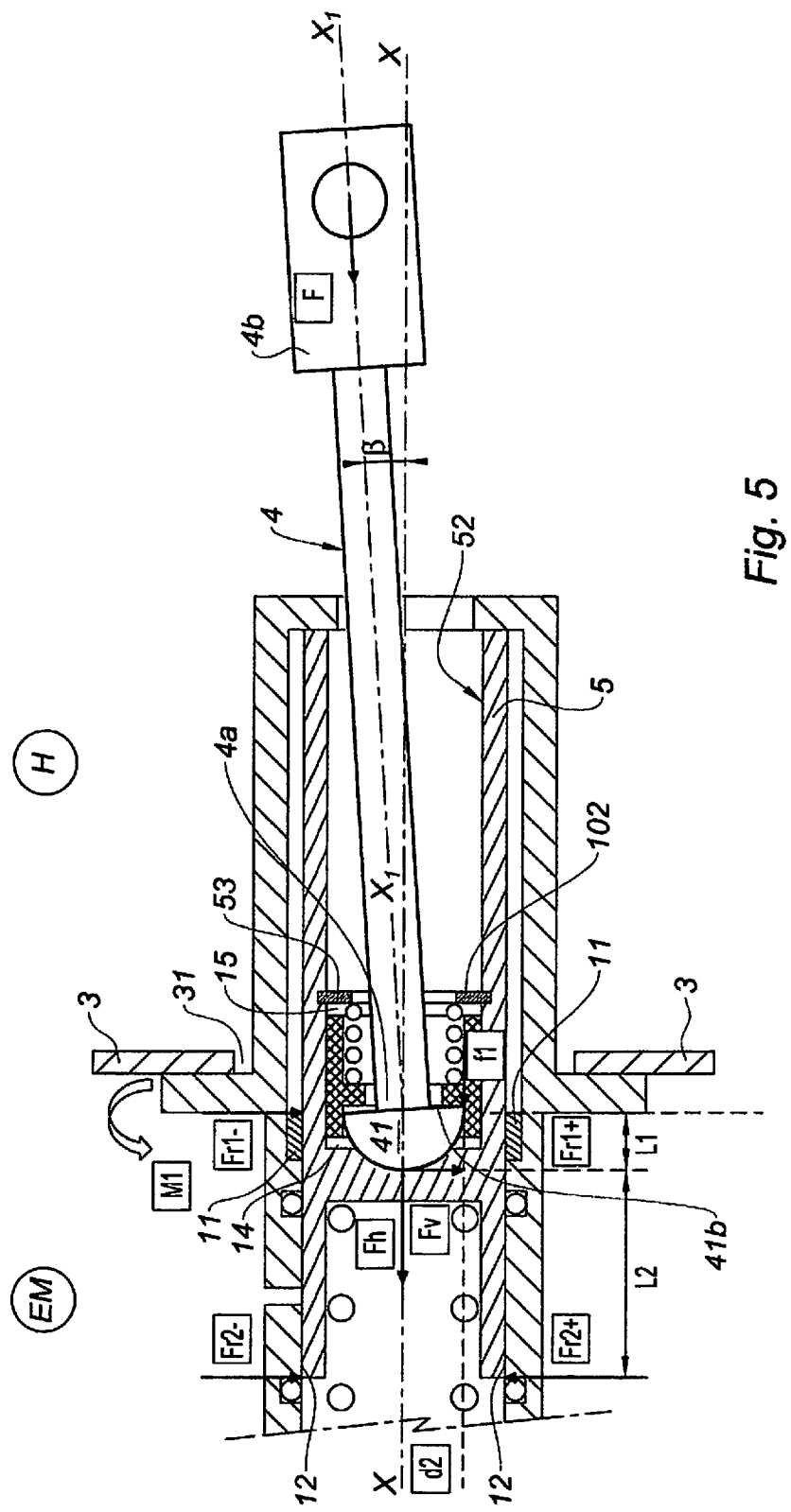
FIG. 5 is a cross-sectional view of the transmission device according to the present invention in the installed position.

In comparison to this state of the art, FIGS. 3, 4, 5 show a first embodiment of the invention, whose description uses the same numerical references as FIGS. 1 and 2, without, however, the use of the (') when referring to identical or analogous elements.

According to FIG. 3, the decoupled braking system according to the present invention, shown before installation in the vehicle, has transmission device 1 connecting the brake pedal to actuator 2. Movement of the brake pedal, activated by the driver, is transmitted by control rod 4, connected to thrust rod 5, guided in cylinder 24 with axis XX; its movement is detected by sensor 6, which generates the control signal for the braking system. Extremity 4a of rod 4 is connected to thrust rod 5 by ball joint connector 8, combined with elastic means 10 to return control rod 4 toward/along axis XX of cylinder 24 and following the movement of translation of thrust rod 5. Ball joint connector 8 is realized by means of spherical cap 41 carried by extremity 4a of control rod 4. Spherical front face 41a of cap 41 enters spherical cup 42 of the same radius, realized in bottom 51 of thrust rod 5. The flat surface of rear face 41b of cap 41 is perpendicular to axis X1X1 of control rod 4.

The diameter of cap 41 is less than the diameter of borehole 52 of thrust rod 5 on the side turned toward control rod 4.

Cylindrical sleeve 9, freely surrounding control rod 4, slides in borehole 52 of thrust rod 5. On the inside is flange 91, and cap 41 has a diameter less than the internal diameter of sleeve 9 so it can be housed, at least partly, in sleeve 9 in front of flange 91. In other words, flat face 41b of cap 41 rests, at least locally, against flange 91, depending on the inclination of axis X1X1 of rod 4. This flange 91 of cylindrical sleeve 9, which thereby forms a centering sleeve, occupies a plane perpendicular to axis XX of thrust rod 5.

Centering spring 101, for example, a helical compression spring or a stack of Belleville washers, is pressed against thrust rod 5 by retaining ring 102 embedded in thrust rod 5. Centering spring 101 freely surrounds control rod 4.

Centering spring 101 is partly engaged in sleeve 9 on the side of control rod 4 and rests against flange 91, thereby pushing sleeve 9 against face 41b of cap 41.

The components are dimensioned so that when in rest position (FIG. 5) there exists an interval 14 between sleeve 9 and thrust rod 5 and an interval 15 between sleeve 9 and retaining ring 102.

Before its installation in a vehicle, in the absence of elastic return means 10 (spherical cap 41 with flat rear face 41b, sleeve 9, and centering spring 101), transmission device 1 would pivot due to its weight in position X1X1, as shown in FIG. 3.

This position is the limiting pivot position allowed by the geometry of thrust rod 5. The weight of rod 4 is applied to its center of gravity in such a way that the rod pivots by means of cap 41 in cup 42 around the center of articulation at ball joint 8.

In device 1 of FIG. 3, before installation in the vehicle, the device is in the aligned position of FIG. 4. This position precedes that of the assembly of extremity 4a at the brake pedal, which is the assembled position shown in FIG. 5.

FIG. 3 shows the maximum inclination X1X1 of rod 4 before the installation of electromechanical brake booster 2, assuming that centering spring 101 is not active.

The high point of the edge of flat face 41b of cap 41 is pressed against flange 91 of centering sleeve 9. Centering spring 101 must compensate for the tilt of control rod 4 while also accounting for the friction of cap 41 in cup 42.

Centering spring 101 is dimensioned to compensate for this tilting movement of control rod 4 in such a way that, before installation in the car body, it is in axis XX of thrust rod 5 to facilitate installation of electromechanical brake booster 2 in the vehicle, that is, to pass control rod 4 through opening 31 of firewall 3 and then affix the brake booster to firewall 3.

The assembly between extremity 4b of control rod 4 and the brake pedal takes place separately, and from passenger compartment H.

The dimensioning of centering spring 101 is calculated on the basis of the geometric indications of FIG. 5 and the physical characteristics of control rod 4 and thrust rod 5.

For reasons of bulk and so as not to influence the movement of control rod 4 once installed, centering spring 101 must not be overdimensioned with respect to the cal-culated force needed to keep it aligned with thrust rod 5 when installing electromechanical brake booster 2.

As a simple example, and using the following data:

| | |
|---|---|
| Diameter of the control rod | 8 mm |
| Length of the control rod | 300 mm |
| Material of the control rod | steel |
| Lever arm | 200 mm |
| Offset of the alignment force | 4.5 mm) |

Coefficient of friction of the ball joint articulation 0.2 through calculation, we obtain a restraining force of 28 N.

The return force in the numerical example above is low and does not play a role in the operation of the transmission device once installed, although at this time control rod 4 is not aligned along axis XX, as shown in FIG. 4 and, therefore, subject to the thrust of centering or retainer spring 101. But the force exerted at this moment by spring 101, although negligible in this kinematic chain, with respect to return spring 7 and to the thrust exerted on control rod 4 by the brake pedal, also has an effect on the operation of the device, as will be explained below with the help of FIG. 5.

As already indicated with respect to the state of the art, thrust rod 5 naturally has two guide zones 11, 12 in the borehole of cylinder 24: one of them, 11, between thrust rod 5 and the extremity of the borehole of cylinder 24 and the other, 12, between the extremity of thrust rod 5 and the borehole of cylinder 24.

FIG. 5 shows the system installed in a vehicle. At rest during the installation, rod 4, connected to the brake pedal, makes an angle β, being raised with respect to its aligned position; rod 4 may possibly be inclined below axis XX.

Initially, when the brake pedal is pressed, the applied force F is decomposed into horizontal component Fh and vertical component Fv at the interface between extremity 4a of rod 4 and thrust rod 5. Vertical component Fv is distributed between guide zones 11, 12, according to the distances L1, L2. These distributed force components can be oriented downward or upward, depending on the position of the contact point between the borehole of cylinder 24 and thrust rod 5 with respect to guide zone 11 and as a function of the angular position of rod 4 with respect to its axially aligned position, that is, upward or downward. FIG. 5 shows the contact initially to the left of guide zone 11, which signifies that the reaction pushes on contact zones 11, 12 of cylinder 24 in the upward direction for the lower portion of the borehole (Fr1+Fr2+).

If, however, this contact point is initially to the right of guide zone 11, reaction FR2 is downward in the upper portion of borehole 24. Then, when the pedal is activated, the contact point approaches guide zone 11 and, possibly, coincides with the guide zone, finally being displaced to its left. At this point, force Fr2 is oriented upward in the lower portion of cylinder 24.

Figure 6:
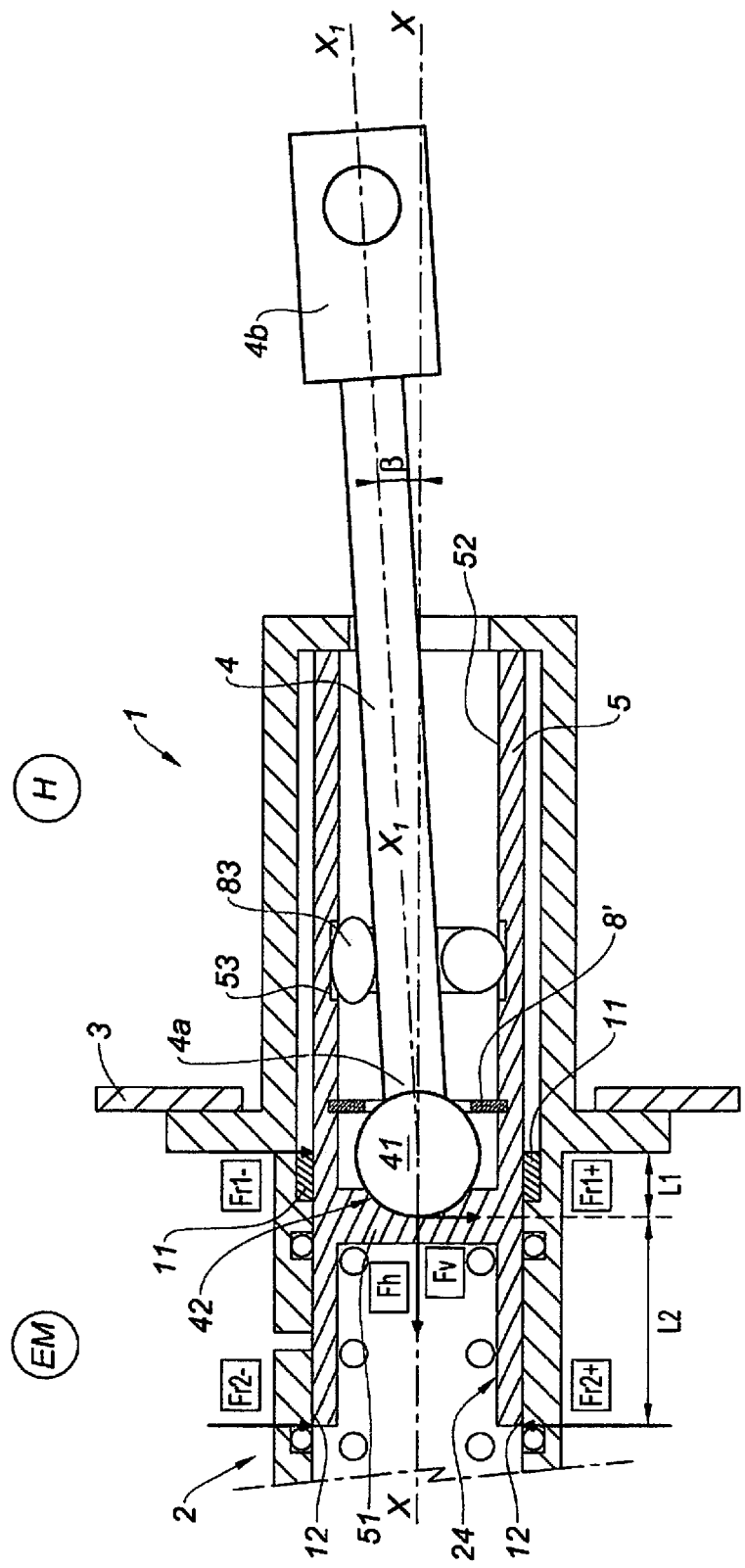
FIG. 6 is a cross-sectional view of a variant embodiment of the transmission device according to the present invention in the installed position.

FIG. 6 shows another embodiment of transmission device 1 and its elastic return means 10, here formed by elastic ring 83 of the present invention, in which ball joint articulation 8 between extremity 4a of control rod 4 and thrust rod 5 consists of ball joint 41 retained in cup 42 of bottom 51 by ring 8' embedded in thrust rod 5 and freely traversed by control rod 4. Elastic ring 83 engaged on control rod 4 is longitudinally retained (along axis XX) in thrust rod 51 by groove 53. Elastic ring 83 is squeezed when installed between thrust rod 5 and rod 4 in such a way that control rod 4 is elastically returned toward axis XX for installation of transmission device 1 in the vehicle. Then, in the installed position, a restoring torque is applied to thrust rod 5, at least partially compensating for the forces applied to the thrust rod by control rod 4, inclined at angle of operation β with respect to axis XX of the movement of thrust rod 5 in cylinder 24.

To conclude and summarize, FIG. 4 schematically illustrates the first embodiment of transmission device 1 with its elastic means 10 to return the control rod to axis XX of thrust rod 5, before installation of the device in the vehicle; elastic means 10 to return control rod 4 to axis XX being composed of spherical cap 41 with flat rear face 41b, of sleeve 9 pushed by centering spring 101.

FIG. 5 shows transmission device 1 of FIG. 3 in installed position, in which the extremity of the spherical cap at extremity 4a of control rod 4 is pushed by sleeve 9, held in tension by spring 101, kept under load with respect to thrust rod 5.

FIG. 6 shows the second embodiment of transmission device 1, wherein elastic return means 10 is composed of elastic ring 83 engaged in groove 53 of borehole 52 of thrust rod 5. This elastic return means operates according to the same principle as the first embodiment, aligning control rod 4 along axis XX of the device for installation and then compensating for the torque applied to thrust rod 5 by offset control rod 4.

The characteristics of spring 101 and elastic ring 83 can be adjusted as a function of the system so that the initial portion of the travel of the thrust rod which is the one most used for day-to-day braking situations, the contact force between the thrust rod and guide zone 11 is greatly reduced and, moreover, these are distributed between the upper portion and lower portion of the guide zone. This considerably reduces the energy of wear at the contact zone.

REFERENCE KEY (primes are not shown for the reference numbers given below)
1 Transmission device
2 Electromechanical actuator/electromechanical brake booster
21 Actuator body
22 Base
23 Fastener
24 Cylinder
3 Firewall
31 Opening
4 Control rod
41 Spherical cap
41a Spherical front face
41b Flat rear face
42 Spherical cup
5 Thrust rod
51 Bottom
52 Borehole
53 Groove
6 Sensor
7 Return spring
8 Ball joint connector
81 Ball joint
82 Ring
83 Elastic ring
9 Cylindrical sleeve
91 Flange
93 Internal groove
10 Elastic return means
101 Centering spring
102 Retaining ring
11-12 Guide zones
13 Hydraulic lines
14 Interval between front of sleeve 9 and bottom 51 of the thrust rod
15 Interval between sleeve 9 and retaining ring 101
EM Engine compartment
H Passenger compartment

The invention claimed is:

1. A decoupled electronic braking system with a movement transmission device connecting a brake actuator to a brake pedal, comprising:
   a control rod connected to the brake pedal and including a ball joint;
   a thrust rod that is a piston that:
      is connected to the actuator;
      is guided in a cylinder of the actuator for movement along a central longitudinal axis of the cylinder; and
      has a cup-shaped contact surface in which the ball joint of the control rod is pivotably accommodated, thereby connecting the thrust rod to an extremity of the control rod;
   a return spring that applies a return force to return the thrust rod in a direction against a thrust of the control rod against the thrust rod; and
   an elastic return device, wherein:
      the elastic return device is configured to apply a spring force that radially biases the control rod toward the central longitudinal axis of the cylinder; and
      at least one of:
         (1) the elastic return device is arranged within the thrust rod; and
         (2) at least a portion of the elastic return device abuts against the thrust rod or a retaining surface that is separate from the control rod and is embedded in the thrust rod.

2. The braking system according to claim 1, wherein the elastic return device comprises:
   a sleeve that surrounds the control rod, is arranged to slide within a borehole of the thrust rod, and presses against a flat rear face of a spherical cap of the ball joint, the flat rear surface being perpendicular to the central longitudinal axis of the cylinder, and the spherical cap having a spherical front contact surface; and
   a spring that (1) rests (a) against the thrust rod or the retaining surface embedded in the thrust rod and (b) against the sleeve, and (2) is configured to push the sleeve and tilt the spherical cap and the control rod toward the central longitudinal axis of the cylinder against a force generated by a weight of the control rod.

3. The braking system according to claim 2, wherein the sleeve has a flange against one side of which the flat rear surface of the cap rests and against another side of which the spring of the elastic return device rests.

4. The braking system according to claim 2, wherein the spring of the elastic return device rests against the retaining surface embedded in the thrust rod, the retaining surface being a retaining ring.

5. The braking system according to claim 2, wherein the spring of the elastic return device is a helical spring or a stack of Belleville washers.

6. The braking system according to claim 1, wherein the elastic return device is an elastic ring that:
   is held in place on the thrust rod by an internal groove of the thrust rod;
   is pressed onto the control rod so that a radial compression, by the control rod, of the elastic ring against a borehole of the thrust rod when the control rod tilts away from the central longitudinal axis of the cylinder, generates a return torque toward the central longitudinal axis of the cylinder.

7. The braking system according to claim 1, wherein the elastic return device is arranged within the thrust rod.

8. The braking system according to claim 1, wherein the at least the portion of the elastic return device abuts against the thrust rod.

9. The braking system according to claim 1, wherein the at least the portion of the elastic return device abuts against the retaining surface that is separate from the control rod and is embedded in the thrust rod.

* * * * *